's Patent Office 3,178,482
Patented Apr. 13, 1965

3,178,482
PROCESS FOR FLUORINATING CHLORO-
FLUOROCYCLOPENTENES
Charles F. Baranauckas and Samuel Gelfand, Niagara
Falls, N.Y., assignors to Hooker Chemical Corporation,
Niagara Falls, N.Y., a corporation of New York
No Drawing. Filed May 4, 1960, Ser. No. 26,731
7 Claims. (Cl. 260—648)

This invention relates to a process for the replacement with fluorine of chlorine atoms in chlorofluorocyclopentenes. More particularly, this invention relates to a process for producing 1,2-dichlorohexafluorocyclopentene-1 from chlorofluorocyclopentenes by treatment with hydrogen fluoride over a carbon catalyst.

It is an object of this invention to provide a new process for fluorine substitution in chlorofluorocyclopentenes.

Another object is to provide a process such that the raw material is converted to the desired product with a minimum of by-product formation and substantially all of the recovered unreacted starting material and partly fluorinated products can be recycled for further conversion to the desired end product.

A further object is to provide such a process wherein the desired product is obtained in high yields.

A further object is to provide a fluorination process wherein the reaction may be carried out at substantially atmosphere pressure.

Various other objects and advantages will be apparent to those skilled in the art from the following description and disclosure.

The present invention is concerned with a fluorination process for making 1,2-dichlorohexafluorocyclopentene-1 which comprises passing hydrogen fluoride and a perhalocyclopentene having the formula $C_5Cl_xF_y$, where $x$ is at least three and not more than seven, $y$ is at least one and not more than five, and $x$ plus $y$ equals eight, into a reaction zone containing a carbon catalyst and maintained at a temperature between about one hundred and fifty degrees and five hundred degrees centigrade, and withdrawing the product from the said zone.

The reactions are illustrated by the following equations, but are not limited thereto.

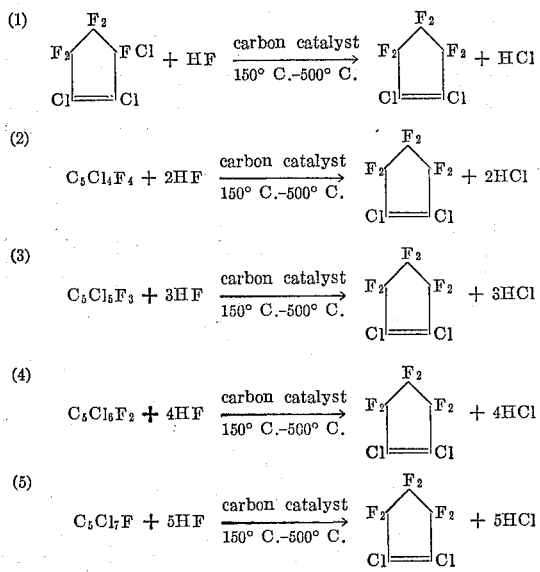

The above equations illustrate complete conversion of the starting materials of this invention to the desired end product. In addition, varying amounts of products, intermediate in fluorine content between the starting material and the desired product of higher fluorine content, 1,2-dichlorohexafluorocyclopentene, may be obtained. We have found that the overall yield of the desired product can be increased by recycling these less fluorinated products back for use in the process with unreacted starting material. Disproportionation of perchlorofluorocyclopentenes to products of lower and higher fluorine content may also take place under the conditions of the process. However, no fluorine is lost in the disproportionation process and the products formed therefrom will also fluorinate to the desired product.

The starting materials may also be those chlorofluorocyclopentenes wherein the double bond contains one to two fluorine substituents. The double bonds in chlorofluorocyclopentenes are known to shift during fluorination reactions. However, only products with two chlorine substituents on the double bond have been isolated.

As will become more evident hereinafter, this invention presents a preferential fluorination technique which is accomplished by the use of a carbon catalyst in conjunction with a critical temperature range. The optimum temperature range is between about one hundred and fifty degrees centigrade and five hundred degrees centigrade. More preferably the temperature range is maintained between about two hundred and fifty degrees centigrade and four hundred degrees centigrade. At temperatures below about one hundred and fifty degrees centigrade, the process becomes uneconomical. At temperatures above about five hundred degrees centigrade, the formation of side and decomposition products that cannot be recycled increases substantially, thereby reducing the product yield.

The contact time may vary from about 0.1 second to about sixty seconds, although the preferred contact time is between about one second and thirty seconds.

The proportions of reactant contacted with the catalyst may vary within relatively wide limits depending largely upon the nature of the reactants, the conditions of operations and the results desired. It is preferred that the reactant hydrogen fluoride be substantially anhydrous. The mole ratio of hydrogen fluoride to starting perhalocyclopentene may vary from between 0.1 to one, to about ten to one. Where the starting material is predominately $C_5Cl_3F_5$, the optimum mole ratio is between one to two and two to one. Where the starting material is predominately $C_5Cl_4F_4$, the optimum mole ratio is between one to one and four to one. Where the starting material is predominately $C_5Cl_5F_3$, the optimum mole ratio may be between 1.5 to one and six to one. And where the starting material is predominately $C_5Cl_6F_2$, the optimum mole ratio is between two to one and eight to one.

As long as the reactants are preheated to the desired reaction temperature prior to contact with the catalyst, it matters little what manner in which they are introduced. In practice, it is customary to preheat the reactants and introduce them into the reaction zone containing catalyst simultaneously. After passing through the reaction tube the product is cooled and the liquid products are separated from gaseous products by condensation and separated into individual components by fractionation.

Atmospheric pressure was employed in all the reactions; however, pressures below and above atmospheric pressure may also be employed without departing from the scope of this invention.

The preferred catalyst used in this invention is produced by the Barnebey-Cheney Company, Columbus, Ohio, and marketed as "BD-9" granular active carbon which by analysis showed an ash content of 1.6 percent. However, other types of carbon may be used.

For the purposes of this invention contact time is defined as the ratio between the free space in the reactor (in arbitrary volume units) and the sum of the rates at which the reactants entered the reactor (in the same arbitrary volume units per unit time). An estimate of the free space was obtained in the following way: a graduated cylinder was filled to a given volume mark with catalyst, to this was added an equal volume of solvent liquid and the total volume of the mixture was observed. The difference in volume between that of the mixture and the original solvent represented the space occupied by the catalyst. From this the free space in any catalyst filled container could be estimated provided the volume of said container when empty were known. The rates at which the gaseous reactants entered the reactor was obtained from the molar feed rates per unit time with the application of Charles' law relating the volume of a gas to its absolute temperature (it was assumed that at the temperatures used deviations from ideality were negligible).

The reactor consisted of a one-inch diameter nickel pipe twenty-seven inches long immersed in a salt bath and having a one-quarter inch inlet and outlet as well as a thermometer well through its center. The reactor was packed with catalyst and the temperature maintained constant by convenient means. The exit end of the reactor was slightly lower than the entrance in order to minimize channeling. The inlet tube was also immersed in the salt bath to serve as a preheater for the inlet gases. It is within the realm of this invention to employ a vertical reactor similar in all respects to the horizontal reactor. It is also possible to use a fluidized bed reactor.

The invention will be more fully understood by reference to the following detailed examples in which the parts are by weight. For convenience, the process is described in connection with specific compounds, but they are presented only for the purposes of illustration and not as a limitation.

EXAMPLE 1.—FLUORINATION OF $C_5Cl_3F_5$

Hydrogen fluoride and trichloropentafluorocyclopentene (nine hundred and sixteen grams, 3.51 mols), were passed through the catalyst-filled reactor at flow rates of approximately two mols per hour and one mol per hour respectively. The catalyst used was Barnebey-Cheney "BD–9" granular carbon and the temperature of the reactor was about two hundred and ninety degrees centigrade. The contact time over the catalyst was about twenty-seven seconds. The product was condensed in a receiver containing aqueous caustic to neutralize HCl and HF, separated, washed, and dried; it weighed eight hundred and thirty-nine grams. After separation and analysis the product was found to contain 1.71 mols of 1,2-dichlorohexafluorocyclopentene-1, and 1.61 mols of recovered starting material $C_5Cl_3F_5$, giving a ninety-one percent total yield.

The following table gives the results of Example 1 along with other examples using $C_5Cl_3F_5$ as the starting material.

*Fluorination of trichloropentafluorocyclopentene to 1,2-dichlorohexafluorocyclopentene*

| Example | Flow Rate | | Temp., °C. | Catalyst Contact Time, Sec. | Product Analysis | |
|---|---|---|---|---|---|---|
| | $C_5Cl_3F_5$, Mols/Hr. | HF, Mols/Hr. | | | Percent, $C_5Cl_3F_5$ | Percent, $C_5Cl_2F_6$ |
| 1 | 1.0 | 2.0 | 290 | 27 | 37 | 59 |
| 2 | 1.0 | 2.0 | 340 | 24 | 34 | 61 |
| 3 | 1.0 | 2.0 | 390 | 22 | 35 | 69 |
| 4 | 1.0 | 2.0 | 290 | 7 | 47 | 51 |
| 5 | 1.0 | 2.0 | 340 | 6 | 38 | 58 |
| 6 | 1.0 | 2.0 | 390 | 5.4 | 50 | 50 |

EXAMPLE 7.—FLUORINATION OF $C_5Cl_4F_5$

Hydrogen fluoride (two hundred and thirty-one parts, anhydrous), and tetrachlorotetrafluorocyclopentene (ten hundred and sixty-four parts), were passed through the catalyst-filled reactor maintained at a temperature of about three hundred and fifty degrees centigrade over a four-hour period. The product collected weighed nine hundred and fourteen parts and was fractionated to give two hundred and forty-seven parts of the desired product $C_5Cl_2F_6$ (37.4 percent yield). In addition, one hundred and ninety-three parts of $C_5Cl_3F_5$ and a residue of unreacted starting material were isolated and identified.

EXAMPLE 8.—FLUORINATION OF $C_5Cl_6F_2$

Hydrogen fluoride (anhydrous) and hexachlorodifluorocyclopentene were passed at rates of 2.5 mols per hour and 0.4 mol per hour respectively, through the catalyst-filled reactor maintained at a temperature of about three hundred and fifty degrees centigrade. The organic product collected was fractionated at atmospheric pressure and contained twenty-four weight percent of $C_5Cl_2F_6$, twenty-six weight percent of $C_5Cl_3F_5$, and twenty-eight weight percent of $C_5Cl_4F_4$.

In the process of this invention, after the product 1,2-dichlorohexafluorocyclopentene and the hydrogen halides have been removed from the effluent organic vapors, the unreacted perhalocyclopentene starting materials and the intermediate product fluorinated perhalocyclopentenes can be recycled for further fluorination with HF over carbon. In this manner high overall yields can be obtained.

It is to be understood that the invention is not limited to the examples which have been given. They are only illustrative, and modifications may be made within the scope of the appended claims without departing from the spirit of the invention.

In the above examples, substantially pure starting materials were used. However, it is to be understood that mixtures of starting materials can also be used to obtain the desired product of the process of this invention.

The end product of this invention, 1,2-dichlorohexafluorocyclopentene, is a useful chemical intermediate for preparing highly fluorinated materials not readily accessible by other means. For instance, it can be oxidized to perfluoroglutaric acid, which is useful for making polyesters.

Various other modifications to the process can be made without departing from the spirit of the invention, and we do not wish to be limited to the examples which have been given, except as defined in the appended claims.

We claim:

1. The method of producing 1,2-dichlorohexafluorocyclopentene-1 which comprises passing hydrogen fluoride and a perhalocyclopentene having the formula $C_5Cl_xF_y$, where $x$ is at least three and not more than seven, $y$ is at least one and not more than five, and $x$ plus $y$ equals eight, into a reaction zone containing a carbon catalyst and maintained at a temperature between about one hundred and fifty degrees centigrade and five hundred degrees centigrade, an withdrawing the product from the said zone.

2. The process of claim 1 wherein the molar ratio of hydrogen fluoride to perhalocyclopentene is from about 0.1 to one and about ten to one.

3. The process of claim 1 wherein the contact time of the reactants in the reaction zone is from about 0.1 second to about sixty seconds.

4. The process of producing 1,2-dichlorohexafluorocyclopentene-1 which comprises passing hydrogen fluoride and trichloropentafluorocyclopentene in a mole ratio of between about one to two and about two to one into a reaction zone containing a carbon catalyst and maintained at a temperature between about two hundred and fifty degrees centigrade and about four hundred degrees centigrade, and recovering the product so produced.

5. The process of producing 1,2-dichlorohexafluorocyclopentene-1 which comprises passing hydrogen fluoride and tetrachlorotetrafluorocyclopentene in a mole ratio of between about one to one and about four to one into a reaction zone containing a carbon catalyst and maintained at a temperature between about two hundred and fifty degrees centigrade and about four hundred degrees centigrade, and recovering the products so produced.

6. The process of producing 1,2-dichlorohexafluorocyclopentene-1 which comprises passing hydrogen fluoride and hexachlorodifluorocyclopentene in a mole ratio of between about two to one and about eight to one into a reaction zone containing a carbon catalyst and maintained at a temperature between about two hundred and fifty degrees centigrade and about four hundred degrees centigrade, and recovering the products so produced.

7. The process of producing 1,2-dichlorohexafluorocyclopentene-1 which comprises passing hydrogen fluoride and a mixture of perhalocyclopentene having the formula $C_5Cl_xF_y$, where $x$ is at least three and not more than seven, $y$ is at least one and not more than five, and $x$ plus $y$ equals eight, into a reaction zone containing a carbon catalyst and maintained at a temperature between about one hundred and fifty degrees centigrade and five hundred degrees centigrade, and recovering the products so produced.

References Cited in the file of this patent
UNITED STATES PATENTS

| | | |
|---|---|---|
| 2,005,706 | Daudt et al. | June 18, 1935 |
| 2,885,449 | Stahl et al. | May 5, 1959 |
| 2,900,422 | Stahl et al. | Aug. 18, 1959 |
| 3,024,290 | Henne | Mar. 6, 1962 |
| 3,047,640 | Sweeney | July 31, 1962 |

OTHER REFERENCES

Lovelace: Aliphatic Fluorine Compounds, pages 15–17, Reinhold Publishing Co., New York (1958).

UNITED STATES PATENT OFFICE
CERTIFICATE OF CORRECTION

Patent No. 3,178,482  April 13, 1965

Charles F. Baranauckas et al.

It is hereby certified that error appears in the above numbered patent requiring correction and that the said Letters Patent should read as corrected below.

Column 2, line 23, before "five" insert -- about --; column 3, line 69, for "$C_5Cl_4F_5$" read -- $C_5Cl_4F_4$ --.

Signed and sealed this 21st day of December 1965.

(SEAL)
Attest:

ERNEST W. SWIDER
Attesting Officer

EDWARD J. BRENNER
Commissioner of Patents